Patented Oct. 30, 1934

1,979,213

UNITED STATES PATENT OFFICE 1,979,213

PLANT-PROTECTIVE AGENT AND METHOD OF PREPARING THE SAME

John H. Fales, Baltimore, Md., assignor to The Bowker Chemical Company, Carteret, N. J., a corporation of New York No Drawing. Application January 16, 1931, Serial No. 509,265

6 Claims. (Cl. 167—15)

This invention relates to plant-protective agents, such as insecticides, fungicides, disinfectants, and to processes for preparing the same; more particularly, it relates to agents of that nature which may be used in the form of a spray, wash or other like external application to protect plants against injury or destruction caused by insect attack, or by diseases fostered by the attack of insects, fungi, or other organisms. Among others, the classes of plant-ravaging insects which the invention seeks to combat include the various kinds of aphids and the group commonly known as chewing insects. Agents individually capable of combating the attack of one or another of these classes of insects or capable of protecting plants against diseases of the nature stated have been hitherto known, and in some instances agents or combinations of agents to a certain extent capable of preventing plant injury from more than one source have been produced, but the products have lacked efficiency in one or another of such capabilities, or have been unstable, costly, or unduly bulky, or otherwise imperfectly adapted to commercial use.

The stability of such a preparation, which must often be stored for considerable periods of time without loss of insecticidal or disinfectant properties, is an important characteristic. Bordeaux mixture, for example, a valuable fungicide and insecticide, usually made with lime, copper sulfate, and water, has been found to have a marked instability on long standing, such that it tends to break down, or harden or both. In an attempt to overcome such instability, it has hitherto been the practice to add an excess of lime to the mixture during its manufacture, but while this procedure improved the product somewhat, it fell short of curing the difficulty. In addition to stability, another desirable characteristic for a plant-protective preparation is a capability of being produced in concentrated form and at the same time with its active ingredients uniformly distributed throughout, so that it may be easily packaged for storing and transportation and may be readily diluted for use as a spray, wash, or the like when desired.

Accordingly, a principal object of the invention is to provide a plant-protective preparation in which are advantageously combined a plurality of efficient agents used to prevent plant damage in the respects described, while a further object is the provision of such a preparation in concentrated form, in which the several ingredients are so proportioned as to be present in satisfactory quantity when the preparation is diluted for use as a spray, wash, or the like.

Other objects are to provide a plant-protective agent of the class described, having a high degree of stability whereby it may be kept for long periods of time without undergoing deterioration; to provide an agent of the nature stated in which at least part of its composition is in a relatively permanent colloidal state, resulting in stability and otherwise desirably characterizing the agent for the uses indicated; and to provide in concentrated form an agent of the class just recited which will retain its advantageous colloidal character when diluted for use.

Still further objects include the provision of a plant-protective preparation stabilized by the introduction of an ingredient which is itself an active insecticide or the like, and the provision of an efficient method of preparing agents of the class indicated, in which one or more of the above objects will be achieved. To these and other ends the invention comprises the novel features and compositions herinafter described.

The invention, in a preferred form, is carried out by combining into a final product a number of ingredients containing severally or collectively, a plurality of substances having plant-protective characteristics as insecticides, fungicides, disinfectants, or the like. Among others, substances which have been found to be highly desirable for such purpose are copper, arsenic, and nicotine, and a product into which these or like agents have been suitably combined, as for instance, in the manner to be described, is a stable and intensively active plant-protective preparation.

In making up such a preparation, the copper is embodied in the form of a compound, such, for example, as copper sulfate, or basic copper sulfate, or other salt of that metal having insecticidal or disinfectant properties. Basic copper sulfate, if such is used, may be conveniently prepared by mixing solutions of copper sulfate and lime, the combined result being what is ordinarily known as Bordeaux mixture. Arsenic likewise may be advantageously employed in chemically combined form, such as an oxide, acid, or salt of an arsenic-containing acid; the final product, for example, may conveniently include this element in the form of an arsenate; as calcium arsenate, magnesium arsenate, or the like. As suggested, a third constituent of the preparation may be nicotine, preferably in the free state, although in some cases it may be used as a salt; or other similar alkaloidal contact insecticides may be used.

In combining substances such as the above according to a desirable method of practicing the invention, it has been found that the ingredients used in the method may be of such nature and so prepared that the final product will have qualities markedly superior to those of the constituent substances, if the latter were used individually, and the superiority may extend to physical form, stability, plant-protective characteristics, and the like. Among other substances, Bordeaux mixture has, as has already been stated, a marked instability which detracts from its utility as an insecticide and fungicide, nor has this defect of its nature been satisfactorily overcome prior to this invention, even by the addition of an excess of lime. It has now been discovered, for example, that if an unstable basic ingredient, such as Bordeaux mixture containing an excess of lime, is treated with a neutralizing arsenic-containing substance such as arsenic acid solution, a product results which is considerably less basic, is far more stable, and contains an additional valuable insecticidal ingredient. The result of the treatment is no mere mechanical mixture such, for instance, as the mixtures of Bordeaux and arsenates hitherto proposed, but is a highly stabilized composition in which the ingredients not only may have reacted chemically with each other but may also be at least partially incorporated, along with the products of any such reaction, into a colloid system of great stability.

In the case of Bordeaux mixture containing an excess of lime, treatment with arsenic acid solution gives a product containing not only the desirable active component of the Bordeaux,— i. e., basic copper sulfate,—but also calcium arsenate, a plant-protective agent of high activity, resulting from the chemical reaction of the treatment. The product is further desirably characterized by a colloidal structure which imparts great stability in all respects. The water content of the composition furthermore, may also be made relatively low, so that the final product, including such other substances as may be later added, will have the consistency of a paste; yet the desirable features just described remain unimpaired, nor will harm be done by later diluting the paste for use as a spray or the like. The products of chemical reaction, it will now be understood, may vary with the nature of the substances used; if, for example, dolomitic instead of ordinary lime is employed in the mixture, the result will contain arsenate of magnesium as an additional active ingredient.

To a composition of the sort produced by the treatment described above, additional quantities of calcium arsenate, magnesium arsenate or the like may be added, with desirable effect in many cases, to heighten the insecticidal nature of the material. As hereinbefore suggested, it is of advantage to introduce in the composition nicotine, a nicotine salt or other similar alkaloid, and this ingredient may be mechanically stirred in; it having been found that a substance of this class may be readily associated with such compositions without impairing the stability of the latter, and at the same time it will substantially increase the anti-parasitic and insecticidal character of the final preparation.

It has further been discovered that if a small amount of a natural gum, such as gum arabic, is added to the above substantially stabilized preparation, conveniently after the various active ingredients have been combined, all tendency of the latter to break down or harden is somewhat further reduced. The result is a material increase in stability, even, for instance, in a composition produced by the treatment of Bordeaux mixture with arsenic acid.

As a specific example of the practice of the invention, a plant-protective agent was prepared as follows: A quantity of Bordeaux mixture, freshly made from solutions of copper sulfate and lime in the usual proportions, totaling 428 lbs. of paste (containing about 145 lbs. of copper sulfate and about 72 lbs. of quick-lime, slaked before mixing) was treated with a solution containing about 10 lbs. of arsenic acid, $H_3AsO_4$,—the latter quantity being equivalent to about 8 lbs. of arsenic acid anhydride, $As_2O_5$. To the resulting composition, 10.5 lbs. of free nicotine and 6 pounds of gum arabic and 31 lbs. more of calcium arsenate were added and thoroughly stirred in mechanically. The water content of the ingredients was so regulated that the final product was concentrated in the form of a paste (the total water content of the batch being about 104.3 lbs.), thoroughly stable and of a highly insecticidal, fungicidal, and disinfectant nature. Analysis of this product showed the presence of some 45 pounds of calcium arsenate, in addition to basic copper sulfate and nicotine.

It is to be understood that the invention is not limited to the specific compositions and procedures herein described but can be carried out in other ways without departure from its spirit as defined by the following claims.

I claim:

1. A plant-protective agent in stable fluid form, comprising water, a normally unstable active basic ingredient containing basic copper sulfate, and an active ingredient comprising an alkaline-earth arsenate and derived from the reaction of arsenic acid with said first mentioned ingredient, said first mentioned ingredient being inherently stabilized by the inclusion and reaction of said arsenic acid therewith in water.

2. The method of preparing fluid insecticides and the like which comprises stabilizing a normally unstable basic material containing lime and basic copper sulfate by including arsenic acid with the said material in water, for reaction of the said arsenic acid with part of said material to produce an arsenate-containing plant-protective agent colloidally incorporated with the material.

3. The method of preparing fluid insecticides and the like which comprises stabilizing a normally unstable plant-protective material containing copper sulfate and a basic compound of an alkaline earth metal by including arsenic acid with the said material in water, for reaction of the said arsenic compound acid with part of said material to form an arsenate of the alkaline-earth metal colloidally incorporated with the material.

4. A plant-protective agent in stable fluid form comprising water, Bordeaux mixture derived from copper sulfate and lime, and calcium arsenate, said Bordeaux mixture being inherently stabilized by the inclusion and reaction of arsenic acid with the Bordeaux mixture, in water, to produce the calcium arsenate.

5. A fluid plant-protective agent in chemically and physically stable form, containing water, an arsenate of an alkaline-earth metal, and a normally unstable ingredient comprising basic copper sulfate, said ingredients being associated in the inherently stable colloidal structure with the basic copper sulfate ingredient in stabilized form, which is characteristic of the fluid product obtained by the inclusion and reaction of arsenic acid, in water, with a Bordeaux mixture of copper sulfate and an alkaline-earth base.

6. A chemically and physically stable plant-protective paste, containing water, calcium arsenate, and Bordeaux mixture derived from copper sulfate and lime, said ingredients of the paste being associated in the inherently stable colloidal structure with the Bordeaux mixture in stabilized form, which is characteristic of the paste produced by the inclusion and reaction of arsenic acid, in water, with a Bordeaux mixture of copper sulfate and lime.

JOHN H. FALES.

CERTIFICATE OF CORRECTION.

Patent No. 1,979,213.        October 30, 1934.

JOHN H. FALES.

It is hereby certified that error appears in the printed specification of the above numbered patent requiring correction as follows: Page 2, line 134, claim 3, strike out the word "compound"; and that the said Letters Patent should be read with this correction therein that the same may conform to the record of the case in the Patent Office.

Signed and sealed this 8th day of January, A. D. 1935.

Leslie Frazer (Seal)        Acting Commissioner of Patents.